United States Patent
Matsunaga et al.

(10) Patent No.: US 6,764,538 B2
(45) Date of Patent: *Jul. 20, 2004

(54) COATING FOR WATER BLOCKING AGENTS

(75) Inventors: Toshiaki Matsunaga, Suita (JP); Yohei Murakami, Suita (JP); Akira Hattori, Kobe (JP)

(73) Assignee: Nippon Shokubai Co., Ltd., Osaka (JP)

(*) Notice: Subject to any disclaimer, the term of this patent is extended or adjusted under 35 U.S.C. 154(b) by 47 days.

This patent is subject to a terminal disclaimer.

(21) Appl. No.: 09/922,839

(22) Filed: Aug. 7, 2001

(65) Prior Publication Data

US 2002/0037384 A1 Mar. 28, 2002

(30) Foreign Application Priority Data

Aug. 8, 2000 (JP) .......................................... 2000-240197

(51) Int. Cl.⁷ .............................. B32B 1/08; C09K 3/00; C10M 157/00

(52) U.S. Cl. ....................... 106/2; 428/35.8; 428/36.91; 428/68; 428/463; 508/100

(58) Field of Search ........................... 428/36.91, 35.8, 428/68, 463, 425.8, 457, 461; 106/2; 508/100

(56) References Cited

U.S. PATENT DOCUMENTS 4,042,012 A * 8/1977 Perry et al. ...................... 165/1

* cited by examiner

*Primary Examiner*—Sandra M. Nolan
(74) *Attorney, Agent, or Firm*—Sughrue Mion, PLLC (57) ABSTRACT

The present invention relates to a
  coating for water blocking agents to fill empty joint spaces on continuous walls comprising a composition consisting essentially of a water-absorbing resin (a), a hydrophilic binder resin (b) and a solvent (c),
  wherein said hydrophilic binder resin (b) has an acid value of 40 mg KOH/g to 500 mg KOH/g. The present invention also relates to a water blocking construction method using the coating for water blocking agents.

6 Claims, 3 Drawing Sheets

Fig. 3

COATING FOR WATER BLOCKING AGENTS

TECHNICAL FIELD

The present invention relates to a coating for water blocking agents, which is applied in advance, for example, to the joints of sheet piles for constructing a continuous water blocking wall and, after being driven into the ground, absorbs water in the ground and swells and thereby fill empty joint spaces to effect cutoff of water (water blocking), to a sheet pile or steel tubular pipe for water blocking construction methods with the coating applied thereto, and to a water blocking construction method utilizing these.

BACKGROUND ART

Continuous walls composed of sheet piles and used for shoring, for instance, are relatively simple to build and have so far been used as temporary shoring walls in constructing underground installations or secondary protective barriers in industrial waste disposal facilities, among others.

However, for efficiently building continuous water blocking walls of sheet piles, gaps of about several millimeters to about 1 to 2 cm are inevitably formed in joint sections of sheet piles, so that water or some other liquid may disadvantageously leak out through those joint sections of sheet pile.

Accordingly, several technologies have so far been proposed for the purpose of making the joint sections of sheet piles water-cutoff (water blocking), as follows.

For example, a coating composition is proposed in Japanese Kokai Publication Sho-59-166567 and Japanese Kokoku Publication Hei-04-25990 which comprises utilizing an NCO-terminated urethane prepolymer prepared by reacting a polyether polyol with an organic diisocyanate. However, the coating film formed can itself absorb water and shows a low degree of swelling (in order that adhesion on swelling and water absorption may be reconciled) and, therefore, is disadvantageous in that, for filling relatively wide gaps (about 5 to 10 mm), it is necessary to apply the composition thickly and, as a result, the coating films may readily peel off at the time of driving the sheet piles into the ground and the water blocking performance cannot be fully obtained in many instances.

In addition, since the main component is a polyether polyol, the composition is insufficient in chemical stability and may readily be degraded during water blocking (in particular of a chemical substance or a like liquid other than water), hence has a problem from the long-term physical properties viewpoint.

Japanese Kokoku Publication Hei-06-96688 proposes a water-swellable (water-absorbing and swelling) coating composition comprising a solution of an electrolytically dissociable water-absorbing polymer, a polyvalent metal compound and an elastomer in an organic solvent. However, since the water-absorbing polymer is further crosslinked with the polyvalent metal compound and the binder used therein is an elastomer having low (or no) hydrophilicity, the composition is low in swelling capacity and, therefore, for filling a relatively wide gap (about 5 to 10 mm), thick coating therewith is required. As a result, there is a drawback that the coating films may readily peel off at the time of driving the sheet piles into the ground and the water blocking performance cannot be fully obtained in many cases. Furthermore, when the composition is used in a temporary water blocking wall or the like, the elastomer used as binder can hardly be stripped off from the sheet piles. There is a further drawback of the composition that it is very difficult to remove the composition from the sheet piles recovered by extraction.

Japanese Kokai Publication Hei-02-206620 proposes a strip-shaped water-swellable substance which comprises a film formed by applying a solution of a highly water-absorbing polymer and a thermoplastic elastomer in an organic solvent to a release paper, followed by drying, and which is to be adhered to the joint section of a sheet pile. There is a drawback, however, that this substance is much inferior in the efficiency (workability) of application to those joint sections of sheet piles or the like which are complicated in shape as compared with coating application by spraying, for instance.

Japanese Kokai Publication Hei-01-252669 discloses a water-absorbing material which comprises a mixture, molded in a desired shape, of a finely divided water-absorbing resin with a water absorbency of 2 to 50 times and a particle size of not more than 100 $\mu$m and a thermoplastic resin or elastomer. However, when such a water-absorbing materials is used, the swelling of the water-absorbing resin within the coating film is inhibited due to the hydrophobicity of the thermoplastic resin or elastomer; thus, the water blocking performance, namely the capacity of the water-absorbing resin to swell as a result of sufficient absorption of water in the ground to thereby fill up the joint sections of sheet piles and cutoff water (water blocking), decreases.

Japanese Kokai Publication Sho-57-212269 discloses a swelling coating composition which comprises a mixture of a highly water-absorbing polymer as a main component and a solution, in an organic solvent, of a water-insoluble, film-forming polymer showing a water absorbency of not less than 0.5. Since, in such a swelling coating composition, the water-insoluble, film-forming polymer having a water absorbency of not less than 0.5 is not designed to have an adequate degree of hydrophilicity, there is room for contrivance to for retaining the binder function thereof in the step of absorption of water in the ground without inhibiting the swelling of the water-absorbing resin.

As discussed hereinabove, there has never been a water blocking agent in the art that is (1) readily applicable to the substrates (joint sections of sheet piles), (2) less peelable from the substrates (joint sections of sheet piles) in the step of driving them into the ground, (3) high in swelling capacity (for thin films to be high in water blocking performance) and (4) readily removable from the substrates (e.g. joint sections of sheet piles) after use.

SUMMARY OF THE INVENTION

In view of the above-mentioned state of the art, it is an object of the present invention to provide a coating for water blocking agents which is ① easy to apply to the substrate (e.g. joint sections of sheet pile), in particular ② less peelable from the substrates (joint sections of sheet pile) in the step of driving them into the ground, ③ high in swelling capacity (for even thin films to be high in water blocking performance) and ④ readily removable from the substrate (e.g. joint sections of sheet pile) after use.

Another object of the invention is to provide a sheet pile or steel tubular pipe for water blocking construction methods to which the above coating for water blocking agents has been applied in advance to form a water blocking coating film less peelable in the step of driving the sheet pile into the ground and showing high water blocking performance, and a water blocking construction method which comprises utilizing the above coating for water blocking agents and/or the sheet pile or steel tubular pipe for water blocking construction methods and which is good in workability (with less peeling on the occasion of driving the sheet pile into the ground) and high in water blocking performance and enables easy recovery and cleaning of the sheet pile after use.

The present inventors studied intensively in an attempt to solve the above problems and in search for a coating for water blocking agents which is ① easy to apply to the substrate (e.g. joint sections of sheet pile), ② less peelable from the substrates (joint sections of sheet pile) in the step of driving them into the ground, ③ high in swelling capacity (for even thin films to be high in water blocking performance) and ④ readily removable from the substrate (e.g. joint sections of sheet pile) after use.

As a result, they found that the above problems can be solved by applying, to the substrate in advance, a coating for water blocking agents which comprises a water-absorbing resin (a), a hydrophilic binder resin (b) and a solvent (c) as essential components and in which the hydrophilic binder resin (b) has an acid value within a specific range. They also found that the effects of the invention can be more fully produced when the above coating for water blocking agents forms a water blocking coating film on the steel material surface and when the ratio (X/Y) between the adhesion (X) of the water blocking coating film to the steel material surface and the breaking strength (Y) of the above water blocking coating film is not less than 0.5. They further found that a water blocking construction method which comprises utilizing a sheet pile or steel tubular pipe for water blocking construction methods to which the above coating for water blocking agents has been applied in advance, or which comprises utilizing the above coating for water blocking agents and the sheet pile or steel tubular pipe for water blocking construction methods can improve the efficiency of a foundation work or the like in the field of civil engineering and construction. Based on these findings, they have now completed the present invention.

Thus, the invention provides a coating for water blocking agents comprising a water-absorbing resin (a), a hydrophilic binder resin (b) and a solvent (c) as essential components where in said hydrophilic binder resin (b) has an acid value of 40 mg KOH/g to 500 mg KOH/g.

The invention also provides a sheet pile or steel tubular pipe for water blocking construction methods wherein the above coating for water blocking agents has been applied thereto in advance.

The invention further provides a water blocking construction method which comprises utilizing the above coating for water blocking agents and/or the above sheet pile or steel tubular pipe for water blocking construction methods.

EXPLANATION OF SYMBOLS 1, 2—The surface to which the water blocking agent is to be applied;
3—The gap in which the water blocking agent swells and blocking water;
4—The surface to be connected to the water penetration rate measuring apparatus (FIG. 2);
5—A glass tube;
6—An acrylic cylinder (ø 30 mm);
7—An epoxy-based sealant;
8—A Teflon plate;
9—The site connecting the surface 4 of the gap (FIG. 1) after application of the water blocking agent.

DETAILED DESCRIPTION OF THE INVENTION

In the following, the present invention is described in detail.

The coating for water blocking agents according to the invention, when applied to the substrate surface, forms a water blocking coating film (water blocking layer) and thereby fills the gap between substrates (more specifically between neighboring substrates) for attaining the cutoff of water. It produces such effects as mentioned below under (1) and (2).

Thus, (1) the water blocking coating film absorbs water in the ground (soil) and swells and thus fills the gap between substrates, whereby the cutoff of water can be realized. For example, in cases that substrates such as sheet piles are used to construct a continuous sheet pile wall, if the substrates alone are driven into the ground (soil), gaps are formed in the joint sections between substrates, allowing leakage of water. If a water blocking layer is formed on a substrate surface in the joint section, the water blocking layer absorbs water in the ground (soil) and swells and thus fills the joint section gap between substrates, whereby cutoff of water can be realized. According to the present invention, the composition comprises, as essential components, the water-absorbing resin (a), hydrophilic binder resin (b) and solvent (c) and the hydrophilic binder resin (b) has an acid value within the range specified above and, as a result, the water blocking performance can be fully obtained and, in addition, when the above ratio (X/Y) is within the above specified range, the water blocking coating film becomes less peelable during driving of the substrates into the ground, with the result that the water blocking performance can be more fully exhibited in the ground (soil).

(2) Since the coating for water blocking agents to form a water blocking coating film comprises, as essential components, the water-absorbing resin (a), hydrophilic binder resin (b) and solvent (c), the water-absorbing resin (a) absorbs water in the ground (soil) and swells and the hydrophilic binder resin (b) performs the binder function thereof, so that the water blocking performance can be more reliably exhibited. Further, since the solvent (c) is used as an essential component, the water-absorbing resin (a) will not absorb water or swell in the step of application of the coating for water blocking agents, hence the composition can be applied uniformly. The composition is low in viscosity and therefore can be applied by spraying or the like method, hence the application work can be facilitated.

The coating for water blocking agents according to the invention is first described below.

The water-absorbing resin (a) to be used in the practice of the invention is not particularly restricted but may be any of those resins which absorb water and thus swell and show an absorbency of not less than 3 times the original weight for deionized water (25° C., 1 hour). However, synthetic water-absorbing resins produced by crosslinking water-soluble or hydrophilic compounds (monomers and/or polymers) with a crosslinking agent, such as mentioned below by way of example, are preferred to natural water-swellable substances (gelatin, agar, etc.) since they are better balanced and, further, more readily adjusted for balancing among swelling capacity, water-soluble fraction, water-absorbing rate, strength and the like than the natural water-swellable substances (gelatin, agar, etc.).

The above-mentioned water-absorbing resin (a) specifically includes, among others, crosslinked poly(meth)acrylic acid, crosslinked poly(meth)acrylic acid salts, crosslinked sulfo-containing poly(meth)acrylic acid esters, crosslinked polyoxyalkylene-containing poly(meth)acrylic acid esters, crosslinked poly(meth)acrylamide, crosslinked (meth) acrylic acid salt-(meth)acrylamide copolymers, crosslinked hydroxyalkyl (meth) acrylate-(meth) acrylic acid salt copolymers, crosslinked polydioxolane, crosslinked polyethylene oxide, crosslinked polyvinylpyrrolidone, crosslinked sulfonated polystyrene, crosslinked polyvinylpyridine, starch-poly(meth) acrylonitrile graft copolymer hydrolyzates, crosslinked starch-poly(meth) acrylic acid (salt) graft copolymers, polyvinyl alcohol-maleic anhydride (salt) reaction products, crosslinked polyvinyl alcohol sulfonic acid salts, polyvinyl alcohol-acrylic acid graft copolymers, polyisobutylene maleic acid (salt) crosslinked polymers, and the like. These water-absorbing resins may be used singly or two or more of them may be used in combination.

The water-absorbing resin (a) to be used in the practice of the invention is preferably a salt-resistant one. The reason why a salt-resistant water-absorbing resin is preferred is that such a resin is relatively high in absorbency for hard water containing polyvalent metals and, when used in a coating for water blocking agents, it is not much affected by the quality of water in the soil but can swell enough to exhibit sufficient water blocking performance.

The salt-resistant water-absorbing resin to be used in the practice of the invention is not particularly restricted but may be any of those which show an absorbency of not less than 10 times for artificial seawater (25° C., 24 hours). Among the above-exemplified water-absorbing resins (a), however, those having a nonionic and/or sulfonic acid (salt) group are more preferred and those having an amide or hydroxyalkyl group or a pyrrolidone ring are more preferred. As such salt-resistant water-absorbing resin (e), there maybe mentioned, among others, crosslinked copolymers of a (meth)acrylic acid salt and (meth)acrylamide, crosslinked copolymers of a hydroxyalkyl (meth) acrylate and a (meth) acrylic acid salt, and crosslinked polyvinylpyrrolidone. Further, polyoxyalkylene group-containing ones and crosslinked polyvinylpyrrolidone are particularly preferred. As such water-absorbing resins (a), there may be mentioned, among others, crosslinked copolymers of a methoxypolyoxyalkylene group-containing (meth)acrylate ester and a (meth)acrylic acid salt and crosslinked polyvinylpyrrolidone.

When such a salt-resistant water-absorbing resin is used as said water-absorbing resin, it swells to an expected extent irrespective of the quality of water in the soil (soft water, hard water, etc.), whereby satisfactory water blocking performance can be exhibited with more certainty.

The method of preparing the water-absorbing resin(a) to be used in the practice of the invention is not particularly restricted but may comprise, for example, polymerizing a monomer composition comprising an ethylenically unsaturated monomer having solubility in water, if necessary together with a crosslinking agent. The water-absorbing resin (a), when produced by (co)polymerizing such an ethylenically unsaturated monomer, is higher in water absorbency and generally inexpensive. The above crosslinking agent is not particularly restricted.

The above-mentioned ethylenically unsaturated monomer specifically includes, but is not particularly limited to, acrylic acid, methacrylic acid, itaconic acid, maleic acid, fumaric acid, crotonic acid, citraconic acid, vinylsulfonic acid, (meth)allylsulfonic acid, 2-(meth)acrylamide-2-methylpropanesulfonic acid, 2-(meth)acryloylethanesulfonic acid, 2-(meth)acryloylpropanesulfonic acid as well as alkali metal salts and ammonium salts thereof; N,N-dimethylaminoethyl (meth) acrylate and quaternization products derived therefrom; (meth)acrylamides such as (meth)acrylamide, N,N-dimethyl(meth)acrylamide, 2-hydroxyethyl(meth) acrylamide, diacetone (meth)acrylamide, N-isopropyl(meth) acrylamide and (meth)acryloylmorpholine as well as derivatives of these monomers; hydroxyalkyl (meth) acrylates such as 2-hydroxyethyl (meth)acrylate and 2-hydroxypropyl (meth)acrylate; polyalkylene glycol mono (meth)acrylates such as polyethylene glycol mono (meth) acrylate, polypropylene glycol mono (meth) acrylate, methoxypolyethylene glycol mono(meth)acrylate and methoxypolypropylene glycol mono(meth)acrylate; N-vinyl monomers such as N-vinyl-2-pyrrolidone and N-vinylsuccinimide; N-vinylamide monomers such as N-vinylformamide, N-vinyl-N-methylformamide, N-vinylacetamide and N-vinyl-N-methylacetamide; vinyl methyl ether; and so forth. These ethylenically unsaturated monomers may be used singly or two or more of them may be used in combination.

Among the ethylenically unsaturated monomers specifically mentioned above, those ethylenically unsaturated monomers which have a nonionic group and/or a sulfonic acid (salt) group are more preferred, since these are highly resistant to salts. As such monomers, there may be mentioned, for example, 2-(meth)acrylamido-2-methylpropanesulfonic acid, 2-(meth)acryloylethanesulfonic acid, 2-(meth)acryloylpropanesulfonic acid, (meth)acrylamide, hydroxyalkyl (meth)acrylate, methoxypolyethylene glycol mono(meth)acrylate, N-vinyl-2-pyrrolidone and the like. Polyoxyalkylene group-containing ethylenically unsaturated monomers and N-vinyl-2-pyrrolidone are particularly preferred.

More preferred combinations in using a combination of two or more ethylenically unsaturated monomers as monomer components include, but are not particularly limited to, the combination of a (meth)acrylic acid alkaline metal salt, such as sodium acrylate, and acrylamide, and the combination of a (meth) acrylic acid alkaline metal salt and methoxypolyethylene glycol mono(meth)acrylate, for instance.

The water-absorbing resin (a) can be obtained by polymerizing the above monomer components.

The average molecular weight, shape or form, mean particle size and like factors of the water-absorbing resin (a) may be selected according to the composition of the coating for water blocking agents, the binder species, the physical properties thereof, the working environment and so forth.

The mean particle size of the water-absorbing resin (a) is, however, preferably 30 to 800 μm, more preferably 30 to 600 μm, most preferably 30 to 400 μm.

If the mean particle size of the water-absorbing resin (a) to be used in the practice of the invention is above 800 μm, the particle size is excessively large and the particles of the water-absorbing resin (a) unfavorably shows a tendency toward sedimentation upon admixing of the water-absorbing resin (a) with a solution of the hydrophilic binder resin (b) in the solvent (c).

If, on the other hand, the water-absorbing resin (a) has a mean particle size less than 30 μm, the resin unfavorably becomes very difficult to handle (e.g. it scatters like a fine powder)

Now, the hydrophilic binder resin (b), which is a constituent of the coating for water blocking agents of the invention, is described.

The hydrophilic binder resin (b) to be used in the practice of the invention is not particularly restricted but may be any of those which are (1) water-soluble or water-swellable, (2) capable of functioning as a binder to fix the water-absorbing resin (a) on the substrate and (3) soluble in the solvent (c) It includes, among others, (meth)acrylate ester copolymers, polyurethanes, polyesters, polycarbonates, polyvinyl alcohol resins, partially hydrolyzed polyvinyl acetate, and ethylene-polyvinyl alcohol copolymers. These may be used singly or a mixture of two or more of them may be used.

If the above hydrophilic binder resin (b) is too low in hydrophilicity, it will inhibit the swelling of the water-absorbing resin (a), namely decrease the soil water absorption by the resin (a) and inhibit the same from swelling to a sufficient extent, hence the water blocking performance of the coating for water blocking agents will unfavorably decrease. If, conversely, the hydrophilic binder resin (b) has an excessively high level of hydrophilicity, the adhesion of the binder to the substrate on the occasion of absorption of water in the soil will become excessively low, allowing the whole coating film to readily peel off and unfavorably producing a problem from the viewpoint of durability as a water blocking agent. For such reasons as mentioned above, the hydrophilic binder resin (b) should preferably have an appropriate level of hydrophilicity.

For the hydrophilic binder resin (b) to have an appropriate level of hydrophilicity, the acid thereof should be not less than 40 mg KOH/g, preferably not less than 50 mg KOH/g, more preferably not less than 70 mg KOH/g.

If the acid value of the hydrophilic binder resin (b) is less than 40 mg KOH/g, the hydrophilicity will unfavorably become too low.

For the hydrophilic binder resin (b) to retain the binder function thereof in the step of water absorption, the acid value thereof should be not more than 500 mg KOH/g, preferably not more than 300 mg KOH/g, more preferably not more than 200 mg KOH/g.

If the hydrophilic binder resin (b) has an acid value exceeding 500 mg KOH/g, the hydrophilicity thereof will unfavorably become too high.

The glass transition temperature of the above hydrophilic binder resin (b) is not particularly restricted but, for the adhesion to the substrate (e.g. joint sections of sheet pile) to be high and for the coating film to be resistant to peeling off in a large area in the step of driving the substrate (e.g. joint sections of sheet pile) into the ground, the resin (b) preferably has a glass transition temperature of −20° C. to 120° C. If the glass transition temperature is below −20° C., the coating for water blocking agents will give a sticky coating film and, especially when the substrates are piled up after application of the composition, blocking may possibly occur. Also unfavorably, the coating for water blocking agents will become insufficient in strength, hence the coating film will readily peel off in the step of driving the substrate into the ground. Accordingly, a glass transition temperature of not lower than 0° C. is more preferred.

If, on the other hand, the glass transition temperature of the hydrophilic binder resin (b) is above 120° C., the binder layer will become excessively hard, hence the adhesion to the substrate and the flexibility of the water blocking coating film will become insufficient, with the result that the peeling of the coating film and the dropping of the water-absorbing resin (a) will also readily occur unfavorably in the step of burying the substrate in the ground. Therefore, a glass transition temperature not higher than 100° C. is more preferred and it is further preferred that the resin (b) have a glass transition temperature between 0° C. and 20° C. and a glass transition temperature between 20° C. and 100° C., since, in such a case, the softening component and the shape-retaining component can be better balanced.

The weight average molecular weight (Mw) of the above hydrophilic binder resin (b) is not particularly restricted but preferably is within the range of 30,000 to 300,000, more preferably within the range of 50,000 to 200,000. When the resin to be used has such a weight average molecular weight as mentioned above, the toughness of the water blocking agent and the solubility thereof in alkaline water can be balanced with ease.

The hydrophilic binder resin (b) to be used is preferably soluble in alkaline water (alkaline water-soluble binder resin) since the hydrophilicity thereof can be readily adjusted by adjusting the acid value, for instance.

In the following, the alkaline water-soluble binder resin to be used in the practice of the invention is described.

The alkaline water-soluble resin, which is a preferred example of the hydrophilic binder resin (b) constituting the coating for water blocking agents of the invention, is soluble in a 0.4% (by weight) aqueous solution of NaOH but insoluble in neutral or acidic water but swelling in neutral water. The alkaline water-soluble resin is not particularly restricted but may be any of those having the solubility features defined above. Thus, there may be mentioned, for example, copolymers of an α,β-unsaturated carboxylic acid monomer and another monomer copolymerizable therewith.

As for the above-mentioned solubility in alkaline water, the degree of solubility is not particularly restricted but the term indicates a preferred degree of dissolution of the alkaline water-soluble binder resin to be used as a preferred binder resin in the practice of the present invention, as described later herein. The term "alkaline water-soluble resin (alkaline water-soluble binder resin)" is interchangeable with another term "alkali-soluble resin" However, the term "alkaline water-soluble resin" is more definite and precise, hence the term "alkaline water-soluble resin" is employed in the present specification.

The solubility of the alkaline water-soluble binder resin that is preferably used in the practice of the invention in alkaline water is not particularly restricted unless the features of the invention are impaired.

For example, the above solubility can be defined as a percent weight loss of the alkaline water-soluble resin in such a solubility test as mentioned below. The solubility of the alkaline water-soluble binder resin, which can preferably be used in the practice of the invention, in alkaline water can be determined, for example, by putting 10 grams of moldings (e.g. cylindrical pellets, 3 mm in diameter and 3 mm in length, obtainable, for example, by using a twin-screw extruder, or pieces of other moldings than pellets as obtained by cutting to a size of not larger than 5 mm) of the alkaline water-soluble binder resin to be tested into 500 g of a 0.4% (by weight) aqueous solution of NaOH and, after 24 hours of stirring at 25° C., determining the percent loss in weight of the alkaline water-soluble binder resin in the alkaline water.

That is, if there is any fraction of the resin remaining undissolved after 24 hours of stirring, the fraction is collected by filtration or the like, washed with water and, after drying, weighed. The weight loss can be determined from the weight of the alkaline water-soluble binder resin before solubility testing and that after testing, namely in terms of percent by weight, namely (initial weight—weight after solubility testing)/(initial weight)×100.

As far as the alkaline water-soluble binder resin to be used in the practice of the invention is concerned, this value is preferably 50 to 100% by weight, more preferably 60 to 100% by weight, still more preferably 70 to 100% by weight.

The method of producing the hydrophilic binder resin (b) to be used in the practice of the invention is not particularly restricted but those copolymers which can be obtained by polymerizing an unsaturated monomer composition comprising an $\alpha,\beta$-unsaturated carboxylic acid monomer and some other monomers copolymerizable therewith are preferred.

The $\alpha,\beta$-unsaturated carboxylic acid monomer to be used in the production of the hydrophilic binder resin (b) to be used according to the invention, for instance, includes, among others, $\alpha,\beta$-unsaturated carboxylic acids such as acrylic acid, methacrylic acid, maleic acid, itaconic acid and fumaric acid; $\alpha,\beta$-unsaturated carboxylic acid anhydrides such as maleic anhydride and itaconic anhydride; $\alpha,\beta$-unsaturated dicarboxylic acid monoesters such as maleic acid monoesters, fumaric acid monoesters and itaconic acid monoesters; and the like. The above $\alpha,\beta$-unsaturated carboxylic acid monomer may be used singly or two or more of them maybe used. Among them, acrylic acid and/or methacrylic acid, which is an acrylic $\alpha,\beta$-unsaturated carboxylic acid, is inexpensive and is highly copolymerizable with other unsaturated monomers, hence is preferably used.

As the other monomer copolymerizable with the above $\alpha,\beta$-unsaturated carboxylic acid monomer, there may be mentioned, for example, esters of a mono alcohol containing 1 to 18 carbon atoms with (meth) acrylic acid, such as methyl acrylate, ethyl acrylate, propyl acrylate, butyl acrylate, stearyl acrylate, methyl methacrylate, ethyl methacrylate, propyl methacrylate, butyl methacrylate and stearyl methacrylate; nitrile group-containing vinyl monomers such as acrylonitrile and methacrylonitrile; amido group-containing vinyl monomers such as acrylamide and methacrylamide; hydroxyl-containing vinyl monomers such as hydroxyethyl acrylate and hydroxypropyl methacrylate; epoxy-containing vinyl monomers such as glycidyl methacrylate; $\alpha,\beta$-unsaturated carboxylic acid metal salts such as zinc acrylate and zinc methacrylate; aromatic vinyl monomers such as styrene and a-methylstyrene; aliphatic vinyl monomers such as vinyl acetate; halogen-containing vinyl monomers such as vinyl chloride, vinyl bromide, vinyl iodide and vinylidene chloride; allyl ethers; maleic acid derivatives such as maleic acid dialkyl esters; fumaric acid derivatives such as fumaric acid dialkyl esters; maleimide and maleimide derivatives such as N-methylmaleimide, N-stearylmaleimide, N-phenylmaleimide and N-cyclohexylmaleimide; itaconic acid derivatives such as itaconic acid mono- and dialkyl esters, itaconamides, itaconimides and itaconic acid amide esters; alkenes such as ethylene and propylene; dienes such as butadiene and isoprene; vinyl ethers; sulfonic acid (salt) group-containing unsaturated monomers such as 2-(meth) acryloylpropane sulfonic acid (salts) and 3-allyloxy-2-hydroxypropanesulfonic acid (salts); polyalkylene glycol (meth)acrylates and the like. One or two or more of these may be used.

Among them, alkyl (meth) acrylates are preferred since such esters having various properties are readily available and the Tg (hardness, softness) and the adhesion to the substrate, among others, of the binder resin can be readily adjusted by appropriately combining them and since they show relatively good copolymerizability with $\alpha,\beta$-unsaturated carboxylic acid monomers.

The alkyl (meth) acrylate is used preferably in an amount of 30 to 100% by weight, more preferably 50 to 100% by weight, still more preferably 60 to 100% by weight, still further preferably 70 to 100% by weight, based on the sum (taken as 100% by weight) of the $\alpha,\beta$-unsaturated carboxylic acid and other monomers copolymerizable therewith. Thus, the use of acrylic monomers as other monomers constitutes a preferred mode of embodiment of the alkaline water-soluble resin as the hydrophilic binder resin (b) to be used in the practice of the invention.

The proportions of the above $\alpha,\beta$-unsaturated carboxylic acid monomer and the unsaturated monomer component comprising the other monomers copolymerizable therewith are not particularly restricted but, for example, the proportion of the $\alpha,\beta$-unsaturated carboxylic acid monomer in the whole monomer composition is preferably 7 to 80% by weight, more preferably 7 to 50% by weight, still more preferably 9 to 30% by weight, based on the whole unsaturated monomer composition (taken as 100% by weight) composed of the $\alpha,\beta$-unsaturated carboxylic acid monomer and other monomers copolymerizable therewith.

If the proportion of the $\alpha,\beta$-unsaturated carboxylic acid monomer in the whole monomer composition constituting the above hydrophilic binder resin (b) is less than 7% by weight, a low acid value will result, hence the hydrophilicity will be too low. If the proportion exceeds 80% by weight, the hydrophilicity will become too high, tending to cause problems.

The monomer(s) other than the $\alpha,\beta$-unsaturated carboxylic acid monomer but copolymerizable therewith which is (are) to be used as a starting material (s) in the production of the binder resin by polymerizing the above unsaturated monomer composition in a preferred embodiment of the hydrophilic binder resin (b) of the present invention is used preferably in a proportion of 93 to 20% by weight, more preferably 93 to 50% by weight, still further preferably 91 to 70% by weight, based on the whole unsaturated monomer composition (taken as 100% by weight) composed of the $\alpha,\beta$-unsaturated carboxylic acid monomer and other monomers copolymerizable therewith.

If the proportion of the monomers other than the $\alpha,\beta$-unsaturated carboxylic acid monomer but copolymerizable therewith is less than 20% by weight, the hydrophilicity will become excessively high whereas if it exceeds 93% by weight, the hydrophilicity will become too low. Both the cases are unfavorable.

The method of producing the above-mentioned hydrophilic binder resin (b) with an acid value of 40 mg KOH/g to 500 mg KOH/g is not particularly restricted but any of the ordinary polymerization methods known in the art, such as solution polymerization, bulk polymerization, emulsion polymerization and suspension polymerization can be utilized. Among them, the production thereof by solution polymerization in an organic solvent is preferred, however.

This is because the coating for water blocking agents of the invention can be produced by mixing a water-absorbing resin directly into the solution or dispersion of hydrophilic binder resin (b) obtained by solution polymerization.

As for the mode of polymerization, there may be mentioned radical polymerization, anionic polymerization, cationic polymerization and coordination polymerization, among others, and radical polymerization is preferred as a commercial method of production.

As the polymerization vessel to be used for raw polymer production, there may be mentioned not only a vessel type reactor but also a tubular reactor such as a kneader or static mixer, for instance. If necessary, these rectors may be used in combination. A dropping tank may also be used if necessary. The pressure in the reaction vessel may be at a reduced, ordinary or pressurized level.

The radical polymerization initiator to be used in the radical polymerization is not particularly restricted but includes, among others, azo initiators such as 2,2'-azobisisobutyronitrile and 2,2'-azobis(2,4-dimethylvaleronitrile); and peroxide initiators such as benzoyl peroxide and di-tert-butyl peroxide. Two or more of these radical polymerization initiators may be used in combination.

The solvent to be used in the above solution polymerization is not particularly restricted but may be any of those solvents which do not adversely affect the radical polymerization reaction. Thus, mention may be made of alcohols such as methanol, ethanol and isopropyl alcohol; aromatic hydrocarbons such as benzene and toluene; ketones such as acetone and methyl ethyl ketone; aliphatic esters such as ethyl acetate and butyl acetate; ethylene glycol and derivatives thereof such as ethylene glycol monomethyl ether; propylene glycol derivatives such as propylene glycol monomethyl ether and propylene glycol monomethyl ether acetate; and the like. Two or more of these solvents may be used in combination.

Now, mention is made of the solvent (c) to be used in the practice of the invention.

The solvent (c) may be any of those known in the art and used in conventional coating, without any particular restriction. Thus, for example, one or a combination of two or more of the solvents specifically mentioned hereinabove referring to the method of producing the hydrophilic binder resin (b) can be used.

As for the selection of the solvent (c), a solvent having a boiling point suited for application to the substrate together with safety is preferably selected. By selecting a solvent having a low boiling point, it becomes possible to achieve quick drying, coating film formation in a short period of time, hence easy thick coating. When a solvent having a high boiling point is selected, the working time can be prolonged. By using an organic solvent as the medium, it becomes easy to apply the coating since the swelling of the water-absorbing resin by absorption of water when a water-containing medium is used can be avoided and no gel formation occurs. When a highly volatile solvent such as methyl ethyl ketone or methanol is used, drying can be completed in about 10 minutes, namely very rapidly as compared with the use of water as the medium, and the next work or step can be started swiftly, hence the period of construction or the time for application to the substrate can be markedly curtailed.

If the coating for water blocking agents of the invention contains, as essential components, the water-absorbing resin (a), hydrophilic binder resin (b) and solvent (c) specifically mentioned hereinabove, it may contain another additive or other additives (h), such as another resin, a pigment, one or more of various stabilizers and/or fillers, and so forth unless the characteristic features thereof are impaired.

The proportions of the water-absorbing resin (a), hydrophilic binder resin (b) and solvent (c) and another additive or other additives (h) are not particularly restricted but, for attaining the characteristic features of the coating for water b blocking agents of the invention most satisfactorily, the weight ratio of the sum of the water-absorbing resin (a), hydrophilic binder (b) and solvent (c) to the whole composition, namely $\{[(a)+(b)+(c)]/[(a)+(b)+(c)+(h)]\} \times 100$, is preferably not less than 50% by weight, more preferably not less than 70% by weight, most preferably not less than 80% by weight.

While the proportions of the water-absorbing resin (a), hydrophilic binder (b) and solvent (c) and another additive or other additives (h) are not particularly restricted, it is preferred for attaining the characteristic features of the coating for water blocking agents of the invention satisfactorily that the water-absorbing resin (a) amount to 5 to 60% by weight, the hydrophilic binder (b) to 10 to 70% by weight, the solvent (c) to 5 to 70% by weight and the other additives (h) to 0 to 50% by weight and it is more preferred that the water-absorbing resin (a) amount to 10 to 50% by weight, the hydrophilic binder (b) to 10 to 60% by weight, the solvent (c) to 10 to 60% by weight and the other additives (h) to 0 to 30% by weight.

In a preferred embodiment thereof, the coating for water blocking agents of the invention forms a water blocking coating film on the steel material surface and the ratio (X/Y) between the adhesion (X) of the water blocking coating film to the steel material surface and the braking strength (Y) of the water blocking coating film is not less than 0.5.

Generally, a coating for water blocking agents is applied to the substrate, for example joint sections of sheet piles and, when the sheet pile is driven into the ground, the film on the joint section surface undergoes a great frictional force as a result of mutual friction with the other joint section. The fraction is not uniform but some portion under goes a particularly large local frictional force. If, on such occasion, a large area of the coating film is peeled off, the water blocking performance after such peeling will be very much reduced.

Therefore, the water blocking coating film formed from the coating for water blocking agents should preferably be (1) high in adhesion (especially after drying) to the substrate (mainly steel material) and (2) weak in film breaking strength so that, on the occasion of partial peeling, the surrounding portions may not follow.

In view of such conditions as mentioned above, the coating for water blocking agents of the invention should preferably have a ratio ((X)/(Y)) of the adhesion (X) of the coating film to the substrate and the breaking strength (Y) of the coating film of not less than 0.5, more preferably not less than 0.7, most preferably not less than 1.0.

If the above ratio (X)/(Y) is less than 0.5, the adhesion (X) of the water blocking coating film to the substrate is great as compared with the breaking strength (Y) of the water blocking coating film, so that once the peeling of the coating film has occurred, the peeling propagates through the water blocking coating film, resulting peeling off of a large area thereof; the water blocking performance after peeling markedly decreases, causing problems.

The magnitude of the adhesion (X) of the water blocking coating film to the substrate is not particularly restricted. If, however, the adhesion (X) is excessively low, peeling may occur readily. Therefore, the adhesion (X) is preferably not less than 100 N/cm$^2$, more preferably not less than 300 N/cm$^2$.

The method of determining the adhesion (X) of the water blocking coating film to the substrate is as follows.

Figure 3:
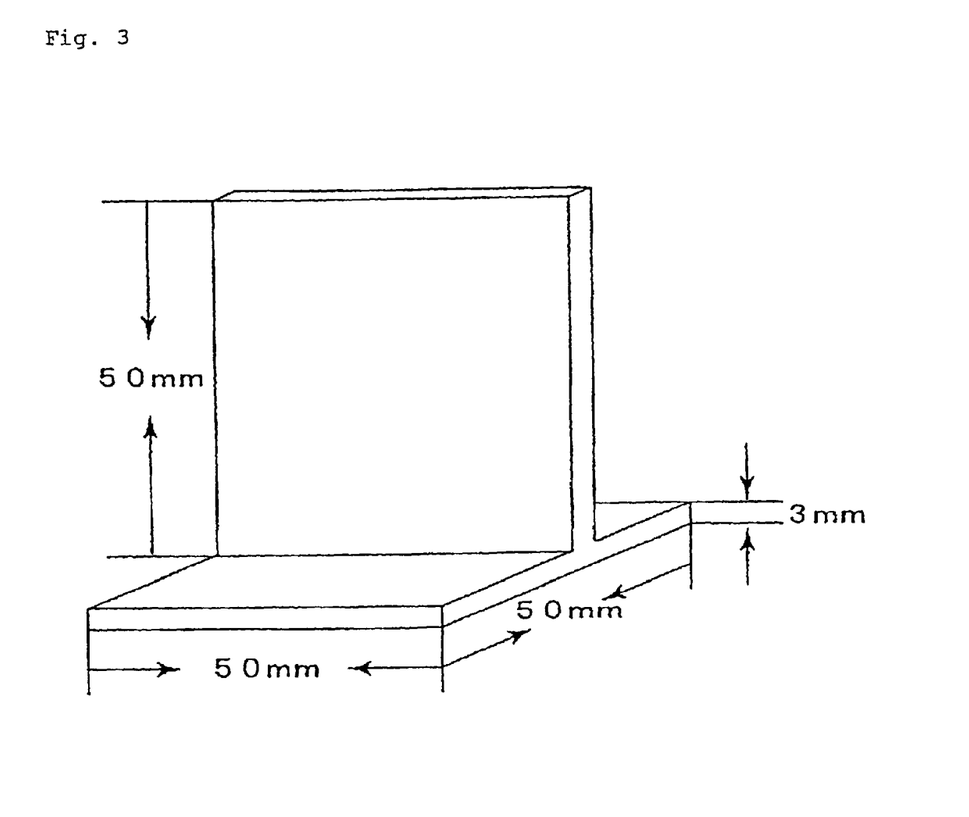
FIG. 3 is a schematic representation of a tool for tensile testing which is used in measuring the adhesion (X) of the water blocking agent of the invention to a substrate.

(1) The water blocking agent is applied to an area of 50 mm×50 mm of the substrate. When, for example, the water blocking agent is a coating film obtained from a coating, the coating is applied to the substrate to a desired film thickness and then dried. When the water blocking agent is a coating film (with an adhesive), the coating film is adhered to the substrate in advance, followed by aging.
(2) Then, a total of two steel devices, such as shown in FIG. 3, are adhered to a steel material, one to the lower surface thereof (no water blocking agent application) and the other to the upper surface (water blocking agent applied, namely on the water blocking film), using an adhesive (e.g. an epoxy-based adhesive (e.g. Araldite (product of Ciba-Geigy) or the like)), followed by a period of aging and curing as designated for the adhesive.
(3) The adhesion (peel force) between the substrate and water blocking agent is determined using a commercially available tensile tester (25° C., pulling rate: 10 mm/min)
(4) The number of specimens (n) is 3 to 5. The mean value of all the data, exclusive of the data for a sample(s) showing peeling between the substrate and water blocking agent, is reported as the adhesion (X).

Then, the method of determining the breaking strength (Y) of the water blocking coating film is as follows.

The breaking strength (Y) of the water blocking coating film is determined basically according to JIS K 6301, punching No. 3 dumbbells from the water blocking coating film and making measurements using a commercially available tensile tester under the conditions: 25° C. and rate of pulling: 50 mm/min. The number of specimens (n) is 3 to 5, and the mean value of all the data (breaking strength data) is reported as the breaking strength (Y).

The coating for water blocking agents of the invention is applied to the substrate surface to form a water blocking coating film and thus produces the beneficial effects thereof. The application to the substrate surface means, among others, (1) that the coating for water blocking agents of the invention is applied to the substrate surface to form a water blocking coating film, (2) that a sheet carrying a water blocking coating film formed by application of the coating for water blocking agents of the invention is stuck to the substrate surface so that the water blocking coating film may be exposed, or (3) that a film made of the coating for water blocking agents of the invention is adhered to the substrate surface.

The method of applying the coating for water blocking agents of the invention is not particularly restricted but may be any coating application method in general use. Specifically, the coating may be applied by using a brush or roller or the like, or by using a sprayer such as a Lithin gun. While the coating should be applied to a substrate surface or a sheet in the area (site) corresponding to the gap to be filled for stop-off, it may be applied to other areas as well. The application amount (at drying) is not particularly restricted but is preferably 100 to 2,000 g/m$^2$, for instance. An application amount less than 100 g/m$^2$ is insufficient for the cutoff of water in the joint sections of sheet piles and fillers are not sufficiently effected, hence the sufficient effects of the invention is probably not produced. An application amount exceeding 2,000 g/m$^2$ will result in an excessively thick coating film and, when the composition is applied to the joint sections of sheet pile, for instance, the friction between joint sections may become excessive in the step of driving the sheet piles into the ground, hence the water blocking agent may be peeled off or the time from application to drying may be prolonged with economical disadvantages. A more preferred application amount is 200 to 1,500 g/m$^2$, still more preferably 400 to 1,500 g/m$^2$. The substrate surface may have been subjected to some other surface treatment or may have been coated with an undercoat.

In cases that the coating for water blocking agents of the invention is applied to a sheet and said sheet is adhered to the substrate surface, the sheet maybe made of a cloth, paper, plastic film, etc. It is also possible to make the coating itself into a sheet by drying the coating without using any substrate and use the sheet. In this case, a pressure-sensitive adhesive or the like is preferably applied to the reverse side of the sheet since this facilitates the sticking to the substrate surface. The adhesive agent is not particularly restricted, and for example, an acrylic adhesive agent or the like in general use may be used.

In view of the workability in applying the coating for water blocking agents of the invention to a substrate having a complicated shape, such as joint sections of sheet piles, the coating is preferably applied to the substrate to form a coating film. A film for sticking, for instance, requires a lot of time in applying to a complicated shape, hence is not very preferred in view of the resulting poor workability.

The substrate on which a water blocking coating film is to be formed by the coating for water blocking agents of the invention is not particularly restricted but may be any of those substrates known in the art to be usable in water blocking works. Thus, mention may be made of, for example, sheet piles (in particular joint sections thereof), steel tubular pipes (in particular joint sections thereof), corrugated plates, H-steels, I-steels, steel tubular pipes, iron poles, concrete piles, poles and other piles or stakes.

The sheet pile or steel tubular pipe for water blocking construction methods with the coating for water blocking agents of the invention having been applied thereof also can produce the effects of the present invention and can effectively be used for improving the efficiency of various foundation works. Such a sheet pile or steel tubular pipe also constitutes an aspect of the present invention. The water blocking construction method which comprises utilizing the coating for water blocking agents of the present invention and/or the sheet pile or steel tubular pipe of the present invention can produce the effects of the present invention as well. Such a water blocking construction method also constitutes an aspect of the present invention.

When the coating for water blocking agents of the invention is used, the mode of substrate working is not particularly restricted. Thus, for example, a hole is dug in the ground and the sheet pile or the like, which is the substrate, is hanged by means of a crane or the like, placed in the hole and buried. The substrate may be pushed into the ground by driving. In accordance with the present invention, in each method of placing, the water blocking layer is prevented from being peeled off from the substrate surface and the water blocking coating film can absorb water and swell sufficiently on the substrate surface, producing the effects of the present invention. The speed of construction thus can be increased and the efficiency thereof can be markedly improved.

Since the present invention has the constitution mentioned above, by applying the coating for water blocking agents according to the invention which comprises, as essential components, the water-absorbing resin (a), hydrophilic binder resin (b) and solvent (c) to the joint sections of various substrates, such as sheet piles (in particular joint sections thereof), steel tubular pipes (in particular joint sections thereof), corrugated sheets, H-steels, I-steels, steel tubular pipes, iron poles, concrete piles, poles and other stakes, in advance prior to constructing a water blocking wall in the ground using them, it becomes possible to substantially prevent the coating films from peeling off on the occasion of driving the substrates into the ground (although partial peeling occurs, the peeled area is small). The coating films rapidly absorb water in the ground and swell and thus fill gaps and exhibit the water blocking performance at an early state. It is further possible for the coating films to maintain the water blocking performance stably at a high level and for a prolonged period of time. The coating films can readily be removed from the substrates after recovery (extraction) thereof.

BEST MODES FOR CARRYING OUT THE INVENTION

The following examples illustrate the present invention more specifically. They are, however, by no means limitative of the scope of the present invention. The acid value of hydrophilic binder resin (b) was determined by the test method described in JIS K 6901 "Methods of testing liquid unsaturated polyester resins", Paragraph 4.3. In cases that the hydrophilic binder resin (b) was insoluble in the solvent prescribed in the test method, an appropriate solvent in which it was soluble was used and otherwise the test was performed according to the above method.

The glass transition point of hydrophilic binder resin (b) was determined by "JIS K 7121: Method of determining phase transition temperatures of plastics" in a nitrogen atmosphere using a Seiko Denshi Kogyo model DSC 220 C apparatus. Test samples were conditioned according to Paragraph 3. (3) of the above-cited JIS.

PRODUCTION EXAMPLE 1

A water-absorbing resin was prepared in the following manner. Thus, a 1.5-liter jacketed desk kneader equipped with a thermometer and a blade (stirring blade) and lined with a trifluoroethylene resin on the inside surface was used as a reactor. The reactor was charged with 53.38 g of methoxypolyethylene glycol methacrylate (mol. wt. 512), 3.56 g of methacrylic acid (mol. wt. 86.09), 217.69 g of sodium methacrylate (mol. wt. 108), 1.4 g of polyethylene glycol diacrylate (as crosslinking agent) and 352.37 g of deionized water (as solvent). The proportion of the crosslinking agent relative to the monomer components was 0.14 mole percent.

While passing water at 50° C. through the jacket, the above aqueous solution was heated to 50° C. with stirring in a nitrogen atmosphere. Then, 10 g of a 11.0% (by weight) aqueous solution of 2,2'-azobis(2-amidinopropane) dihydrochloride (polymerization initiator; mol. wt. 271.27, product of Wako Pure Chemical Industries, Chemical V-50) was added, the mixture was stirred for 10 seconds and then the stirring was stopped and the mixture was allowed to stand. The proportion of the polymerization initiator relative to the monomer components was 0.2 mole percent.

Upon addition of the polymerization initiator, the polymerization reaction immediately started and, after the lapse of 90 minutes, the reactor inside temperature reached 100° C. (peak temperature). Thereafter, while passing warm water at 80° C. through the jacket, the contents were matured further for 30 minutes, whereby a hydrous gel was obtained. After completion of the reaction, the hydrous gel was ground to a finely divided state by rotating the blade and the reactor was then inverted and the hydrous gel was taken out.

The hydrous gel obtained was dried at 140° C. for 3 hours using a hot air circulating drier. After drying, the dried product was comminuted with a bench-top handy mill (manufactured by Kyoritsu Riko). A water-absorbing resin (1) with a mean particle size of 180 μm was thus obtained.

PRODUCTION EXAMPLE 2

A hydrophilic binder resin (b) was prepared in the following manner.

Thus, a 50-liter vessel type reactor equipped with a thermometer and a dropping device was charged with 0.50 kg of acrylic acid, 2.45 kg of ethyl acrylate, 0.15 kg of methyl methacrylate, 12 g of 2,2'-azobis(2,4-dimethylvaleronitrile) (polymerization initiator) and 3 kg of methyl alcohol (solvent). The dropping device was charged with a mixed solution composed of 1.15 kg of acrylic acid, 2.0 kg of methyl acrylate, 3.85 kg of methyl methacrylate, 25 g of 2,2'-azobis(2,4-dimethylvaleronitrile) and 7 kg of methyl alcohol.

The above methyl alcohol solution was heated at 65° C. with stirring in a nitrogen gas atmosphere and the reaction was thus allowed to proceed for 20 minutes. By doing so, the conversion of the contents was adjusted to 72%. Then, while the inside temperature was maintained at 65° C., the above mixed solution was added dropwise from the dropping device uniformly over 2 hours. After completion of the dripping, the contents were further allowed to mature at 65° C. for 3 hours. After completion of the reaction, 10 kg of methyl alcohol was admixed with the contents to give a 33% (by weight) methyl alcohol solution of a hydrophilic binder resin (1).

The thus-obtained hydrophilic binder resin (1) had a weight average molecular weight of 150,000 and an acid value of 130 mg KOH/g. The hydrophilic binder resin (1) was subjected to differential scanning calorimetry and it was found that the hydrophilic binder resin (1) had two glass transition temperatures within the range of −80° C. to 120° C. Further, the methyl alcohol solution of the hydrophilic binder resin (1) as obtained in the above manner was deprived of the solvent using a twin-screw extruder to give cylindrical pellets having a diameter of 3 mm and a length of 3 mm. A 10-g portion of the pellets were introduced into 500 g of a 0.4% (by weight) aqueous solution of sodium hydroxide as placed in a beaker at room temperature and the mixture was stirred using a magnetic stirrer. Complete dissolution was realized in 4 hours.

PRODUCTION EXAMPLE 3

A hydrophilic binder resin (b) was prepared in the following manner. Thus, a 50-liter vessel type reactor equipped with a thermometer and a dropping device was charged with 0.58 kg of acrylic acid, 1.725 kg of methyl acrylate, 2.45 kg of ethyl acrylate, 2.85 kg of methyl methacrylate, 33 g of 2,2'-azobis (2,4-dimethylvaleronitrile) (polymerization initiator) and 15 kg of methyl alcohol (solvent).

The above methyl alcohol solution was heated at 65° C. with stirring in a nitrogen gas atmosphere and the reaction was thus allowed to proceed for 5 hours. By doing so, a 33% (by weight) methyl alcohol solution of a hydrophilic binder resin (2) was obtained. The binder resin obtained had a weight average molecular weight of 100,000 and an acid value of 56 mg KOH/g.

PRODUCTION EXAMPLE 4

A hydrophilic binder resin (b) was prepared in the following manner. Thus, a 50-liter vessel type reactor equipped with a thermometer and a dropping device was charged with 0.47 kg of acrylic acid, 1.725 kg of methyl acrylate, 2.45 kg of ethyl acrylate, 2.96 kg of methyl methacrylate, 33 g of 2,2'-azobis (2,4-dimethylvaleronitrile) (polymerization initiator) and 15 kg of methyl alcohol (solvent). The above methyl alcohol solution was heated at 65° C. with stirring in a nitrogen gas atmosphere and the reaction was thus allowed to proceed for 5 hours. By doing so, a 33% (by weight) methyl alcohol solution of a hydrophilic binder resin (3) was obtained. The hydrophilic binder resin (3) obtained had a weight average molecular weight of 110,000 and an acid value of 45 mg KOH/g.

PRODUCTION EXAMPLE 5

A hydrophilic binder resin (b) was prepared in the following manner. Thus, a 50-liter vessel type reactor equipped with a thermometer and a dropping device was charged with 4.7 kg of acrylic acid, 1.725 kg of methyl acrylate, 1.18 kg of ethyl acrylate, 33 g of 2,2'-azobis(2,4-dimethylvaleronitrile) (polymerization initiator) and 15 kg of methyl alcohol (solvent)

The above methyl alcohol solution was heated at 65° C. with stirring in a nitrogen gas atmosphere and the reaction was thus allowed to proceed for 5 hours. By doing so, a 33% (by weight) methyl alcohol solution of a hydrophilic binder resin (4) was obtained. The hydrophilic binder resin (4) obtained had a weight average molecular weight of 120,000 and an acid value of 480 mg KOH/g.

COMPARATIVE PRODUCTION EXAMPLE 1

A binder resin (b) for comparison was prepared in the following manner. Thus, a 50-liter vessel type reactor equipped with a thermometer and a dropping device was charged with 0.10 kg of acrylic acid, 1.725 kg of methyl acrylate, 2.45 kg of ethyl acrylate, 3.33 kg of methyl methacrylate, 33 g of 2,2'-azobis(2,4-dimethylvaleronitrile) (polymerization initiator) and 15 kg of methyl alcohol (solvent). The above methyl alcohol solution was heated at 65° C. with stirring in a nitrogen gas atmosphere and the reaction was thus allowed to proceed for 5 hours. By doing so, a 33% (by weight) methyl alcohol solution of a binder resin (1) for comparison was obtained. The thus-obtained binder resin (1) for comparison had a weight average molecular weight of 100, 000 and an acid value of 10 mg KOH/g.

COMPARATIVE PRODUCTION EXAMPLE 2

A binder resin for comparison was prepared in the following manner. Thus, a 50-liter vessel type reactor equipped with a thermometer and a dropping device was charged with 5.87 kg of acrylic acid, 1.735 kg of ethyl acrylate, 33 g of 2,2'-azobis(2,4-dimethylvaleronitrile) (polymerization initiator) and 15 kg of methyl alcohol (solvent).

The above methyl alcohol solution was heated at 65° C. with stirring in a nitrogen gas atmosphere and the reaction was thus allowed to proceed for 5 hours. By doing so, a 33% (by weight) methyl alcohol solution of a binder resin (2) for comparison was obtained. The thus-obtained binder resin (2) for comparison had a weight average molecular weight of 110,000 and an acid value of 600 mg KOH/g.

EXAMPLE 1

A coating for water blocking agents (1) according to the present invention was prepared by realizing dispersion by mixing up 50 weight parts of the water-absorbing resin (1) produced in Production Example 1 and 150 weight parts of the 33% methyl alcohol solution of hydrophilic binder resin (1) produced in Production Example 2.

Figure 1:
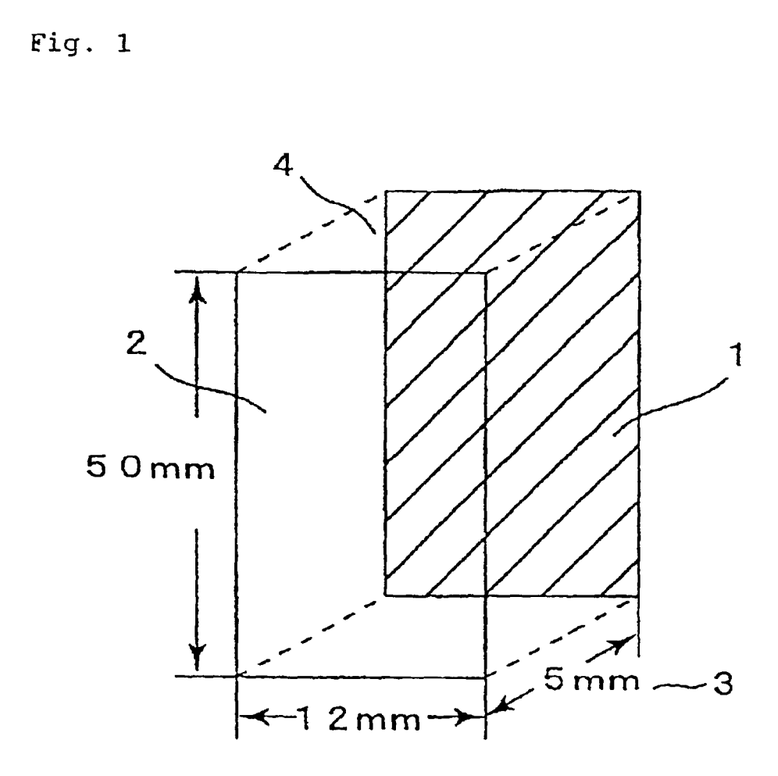
FIG. 1 is a schematic representation of a gap after application of the water blocking agent of the invention for measuring the rate of water penetration, which is an index of the water-blocking performance of the water blocking agent of the invention.

The thus-obtained coating for water blocking agents (1) was applied to one surface (12 mm×50 mm) of each of two substrates made of polyethylene, shown in FIG. 1, to a thickness (thickness at drying) of 660 μm and, after drying, the two coated surfaces were disposed face to face at a distance of 5 mm to form a rectangular parallelepiped gap (5 mm×12 mm×50 mm).

Figure 2:
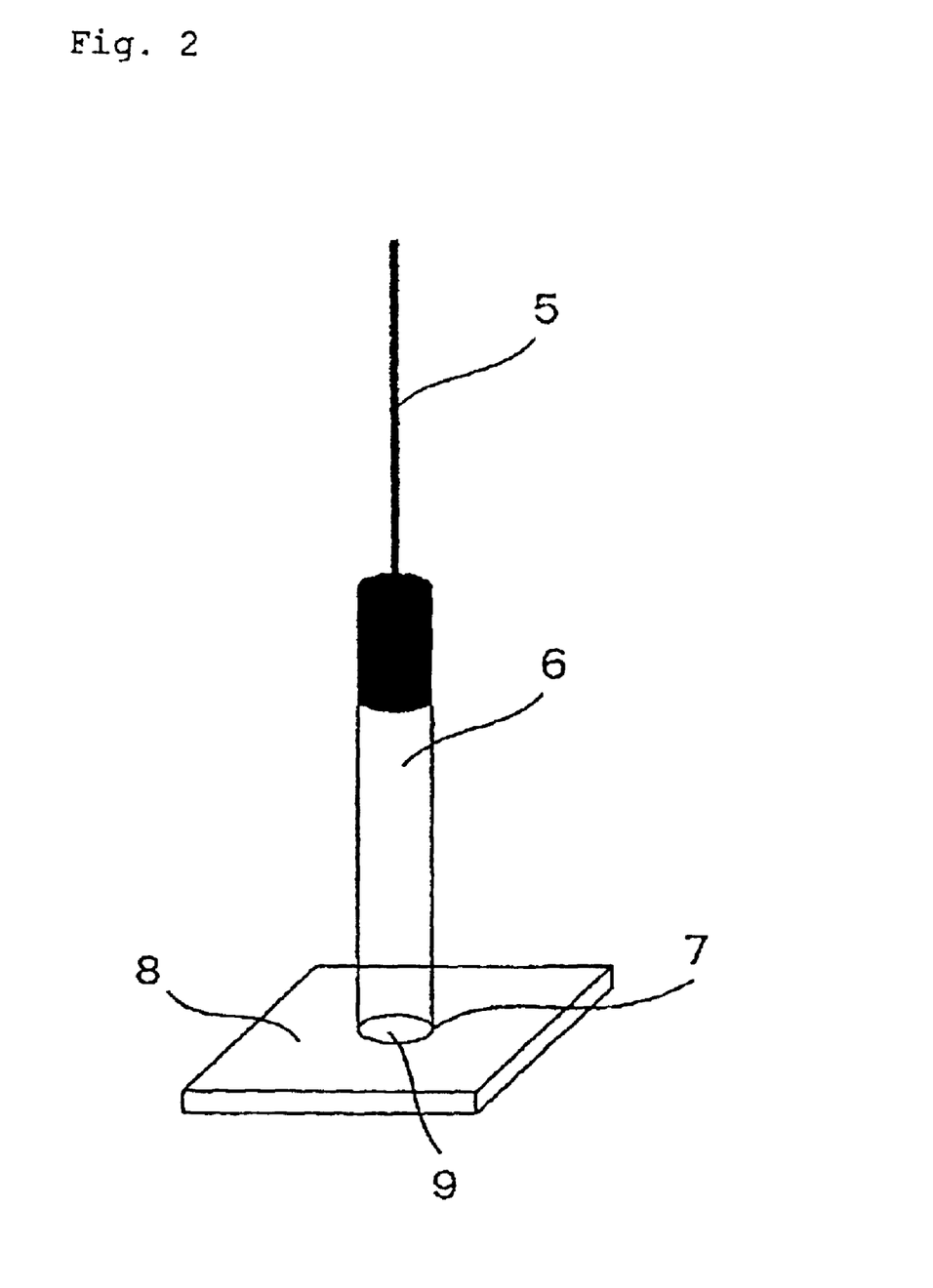
FIG. 2 is a schematic representation of an apparatus for measuring the rate of water penetration, which is an index of the water blocking performance of the water blocking agent of the invention.

Then, the above gap carrying the coating for water blocking agents was placed on the bottom plate of the water penetration rate measuring apparatus shown in FIG. 2, and water level height were determined at timed intervals and the water penetration rates were calculated. The results are shown in Table 1.

EXAMPLE 2

A coating for water blocking agents was prepared and the water penetration rates were determined by the above method of evaluating the water blocking performance in the same manner as in Example 1 except that the coating for water blocking agents (2) was prepared using the hydrophilic binder resin (3) produced in Production Example 4 in lieu of the hydrophilic binder resin (1). The results are shown in Table 1.

EXAMPLE 3

A coating for water blocking agents was prepared and the water penetration rates were determined by the above method of evaluating the water blocking performance in the same manner as in Example 1 except that the coating for water blocking agents (3) was prepared using the hydrophilic binder resin (4) produced in Production Example 5 in lieu of the hydrophilic binder resin (1). The results are shown in Table 1.

COMPARATIVE EXAMPLE 1

The procedure of Example 1 was followed in the same manner except that Pile Lock NS (urethane prepolymer-based coating; product of Nippon Kagaku Toryo) was used as the coating for water blocking agents. The rates of water penetration determined on that occasion are shown in Table 1.

COMPARATIVE EXAMPLE 2

A coating for water blocking agents was prepared and the rates of water penetration were determined by the above method of evaluating the water blocking performance in the same manner as in Example 1, except that the comparative coating for water blocking agents (1) was prepared using the comparative binder resin (1) produced in Comparative Production Example 1 in lieu of the hydrophilic binder resin (1) and that coating was used as the coating for water blocking agents. The results are shown in Table 1.

COMPARATIVE EXAMPLE 3

A coating for water blocking agents was prepared and the rates of water penetration were determined by the above method of evaluating the water blocking performance in the same manner as in Example 1, except that the comparative coating for water blocking agents (2) was prepared using the comparative binder resin (2) produced in Comparative Production Example 2 in lieu of the hydrophilic binder resin (1) and that coating was used as the coating for water blocking agents. The results are shown in Table 1.

of time and at a high level. As comparison of the examples and Comparative Example 3 in which the binder resin used had an acid value of 600 mg KOH/g clearly indicates, the adhesion of the coating films to the joint sections of sheet pile is superior, hence the films can exhibit the water blocking performance stably at a high level for a prolonged period of time, when the acid value of the hydrophilic binder resin is not more than 500 g KOH/g, as evidenced by the results that the films neither peeled off nor dropped from the substrate surface in the examples.

TABLE 1

|  | Ex. 1 | Ex. 2 | Ex. 3 | Compar. Ex. 1 | Compar. Ex. 2 | Compar. Ex. 3 |
| --- | --- | --- | --- | --- | --- | --- |
| Coating for Water blocking agents | Coating (1) | Coating (2) | Coating (3) | Pile Lock NS (product of Nippon Kagaku Toryo) | Comparative coating (1) | Comparative coating (2) |
| Binder acid value (mg KOH/g) | 130 | 45 | 480 | 0 | 10 | 600 |
| Film thickness ($\mu$m) | 660 | 680 | 650 | 2000 | 2000 | 630 |
| Time | | | Water penetration rate ($10^{-6}$ cm/sec) | | | |
| 10 min. | 30.0 | 52.0 | 28.0 | 550 | 600 | 25.0 |
| 1 hr. | 15.0 | 26.0 | 12.5 | 300 | 350 | 11.0 |
| 6 hrs. | 3.0 | 4.5 | 2.0 | 84 | 102 | 0.9 |
| 1 day | 0.6 | 0.9 | 0.7 | 3.5 | 4.5 | Peeled off and dropped |
| 7 days | 0.6 | 0.7 | 0.5 | 1.0 | 1.8 | — |
| 14 days | 0.6 | 0.8 | 0.6 | 0.9 | 1.2 | — |
| 30 days | 0.6 | 0.7 | 0.7 | 1.0 | 1.2 | — |

Film thickness: Film thickness at drying

As is evident from the results shown in Table 1, the coatings for water blocking agents of the present invention gave very good results as water blocking agents, namely (1) the finally attained water penetration rate was low (indicative of high levels of water blocking performance), (2) the time required for arrival at the final water penetration rate was short (arrival in about 1 day; rapid rate of swelling) and (3) thin films could exhibit high levels of water blocking performance (inexpensive; less peelable in the step of driving sheet piles or the like into the ground), among others. Pile Lock NS (urethane prepolymer-based composition; product of Nippon Kagaku Toryo) gave inferior results as a water blocking agent as compared with Example 1, namely (1) the finally attained water penetration was rather high (about 2 times as compared with Example 1; somewhat lower water blocking performance), (2) the time required for arrival at the final water penetration rate was long (arrival in about 7 days; slow rate of swelling) and (3) thick films were required for exhibiting a sufficient level of water blocking performance (expensive; readily peelable on the occasion of driving sheet piles and the like into the ground).

Further, as is evident from Table 1, the examples in which the hydrophilic binder resins having an acid value of 45, 130 or 480 mg KOH/g were used, when compared with Comparative Example 1 in which the urethane prepolymer used had no acid value and Comparative Example 2 in which the binder resin used had an acid value of 10 mg KOH/g, showed lower initial water penetration rates and, when the acid value of the hydrophilic binder resin is not less than 40 mg KOH/g, the water-absorbing resin (a) rapidly absorbed water and swelled and the water blocking performance was thereby exhibited at an early stage and the water blocking performance was maintained stably for a prolonged period

EXAMPLE 4

A coating for water blocking agents (4) according to the present invention was prepared by realizing dispersion by mixing up 50 weight parts of the water-absorbing resin (1) produced in Production Example 1 and 150 weight parts of the 33% methyl alcohol solution of hydrophilic binder resin (2) produced in Production Example 3.

The coating for water blocking agents (4) was applied to the joint section of each of two experimental sheet piles (width 100 mm, length 500 mm) to a thickness (thickness at drying) of 680 $\mu$m and, after thorough drying, these two sheet piles were interlocked and driven into the ground on the premises of the applicant's company (Suita City, Osaka Prefecture) and, immediately thereafter, extracted and examined for the condition of the coating films on the joint sections by visual observation.

As a result, about 15 to 20 sites of peeling with a width of 1 to 2 mm and a length of about 10 mm were observed on the joint section having a length of 500 mm (per sheet pile).

As mentioned above, when the coating for water blocking agents (4) of the invention was used, the number of peeling sites was rather many but the peeled area was very small and the adhesion of the coating film in the step of driving the sheet piles into the ground was good.

COMPARATIVE EXAMPLE 4

The procedure of Example 1 was followed in the same manner except that Pile Lock NS (urethane prepolymer-based composition, product of Nippon Kagaku Toryo) was applied to a thickness of 2,000 $\mu$m instead of applying the coating for water blocking agents (4) to a thickness of 680

μm and, after extraction, the condition of the coating film on the joint section was examined by visual observation in the same manner as in Example 1.

As a result, about 10 sites of peeling with a width of 5 to 10 mm and a length of about 10 to 50 mm were observed on the joint section having a length of 500 mm (per sheet pile).

As mentioned above, when Pile Lock NS (urethane prepolymer-based composition, product of Nippon Kagaku Toryo) was used, the number of film peeling sites was rather less but the peeled area was considerably large and the adhesion of the coating film in the step of driving the sheet piles into the ground was poor.

EXAMPLE 5

A 200-μm-thick coating film was formed by drying the water blocking agent (1) of Example 1 on a Teflon sheet. A portion (about 0.5 g) was cutoff from the coating film and tested for swelling rates ((film weight after swelling—film weight before swelling)/film weight before swelling, 25° C., after 24 hours of immersion) in deionized water and artificial seawater (Aquamarine S (product of Yashima Yakuhin) for 25 L) and for water absorbing rate (swelling (times) after 10 minutes of immersion). The results are summarized in Table 2.

COMPARATIVE EXAMPLE 5

The procedure of Example 5 was followed in the same manner except that a coating film (film thickness 200 μm) made of Pile Lock NS (urethane prepolymer-based composition, product of Nippon Kagaku Toryo) was used in lieu of the coating film made of the coating for water blocking agents (1), and the swelling rates ((film weight after swelling—film weight before swelling)/film weight before swelling, 25° C., after 24 hours of immersion) and the water absorbing rate (swelling (times) after 10 minutes of immersion) were determined. The results are summarized in Table 2.

TABLE 2

|  | Ex. 5 | Compar. Ex. 5 |
|---|---|---|
| Coating for water blocking agents | Coating (1) | Pile Lock NS |
| Swelling (times, 25° C., 24 hrs) |  |  |
| Deionized water | 15 | 4 |
| Artificial seawater | 10 | 3 |
| Water absorbing rate (deionized water) | 10 | 1.2 |

Swelling (times): (Film weight after swelling (immersion) - film weight before swelling (immersion))/film weight before immersion, (times)
Water absorbing rate: Swelling (times) after 10 minutes of film immersion
Artificial seawater: Aquamarine S (product of Yashima Yakuhin) for 25 L was used As is seen from the results in Table 2, the coating film of the coating for water blocking agents (1) of the present invention gave good results, namely both the water absorbing rate and swelling rate (water, artificial seawater) were high. On the contrary, the coating film from Pile Lock NS (urethane prepolymer-based composition, product of Nippon Kagaku Toryo) gave poor results, namely both the water absorbing rate and swelling rate (water, artificial seawater) were low.

PRODUCTION EXAMPLE 6

A water-absorbing resin was prepared in the following manner. Thus, a 1.5-liter jacketed desk kneader equipped with a thermometer and a blade (stirring blade) and lined with a trifluoroethylene resin on the inside surface was used as a reactor. The reactor was charged with 58.38 g of methoxypolyethylene glycol methacrylate (mol. wt. 512), 3.56 g of methacrylic acid (mol. wt. 86.09), 212.69 g of sodium methacrylate (mol. wt. 108), 1.4 g of polyethylene glycol diacrylate (as crosslinking agent) and 350.37 g of deionized water (as solvent). The proportion of the crosslinking agent relative to the monomer components was 0.14 mole percent.

While passing warm water at 50° C. through the jacket, the above aqueous solution was heated to 50° C. with stirring in a nitrogen atmosphere. Then, 10 g of a 10.0% (by weight) aqueous solution of 2,2'-azobis(2-amidinopropane) dihydrochloride (polymerization initiator; mol. wt. 271.27, product of Wako Pure Chemical Industries, Chemical V-50) was added, the mixture was stirred for 10 seconds and then the stirring was stopped and the mixture was allowed to stand. The proportion of the polymerization initiator relative to the monomer components was 0.2 mole percent.

Upon addition of the polymerization initiator, the polymerization reaction immediately started and, after the lapse of 90 minutes, the reactor inside temperature reached 100° C. (peak temperature). Thereafter, while passing warm water at 80° C. through the jacket, the contents were aged further for 30 minutes, where by a hydrous gel was obtained. After completion of the reaction, the hydrous gel was ground to a finely divided state by rotating the blade and the reactor was then inverted and the hydrous gel was taken out.

The hydrous gel obtained was dried at 140° C. for 3 hours using a hot air circulating drier. After drying, the dried product was comminuted with a bench-top handy mill (manufactured by Kyoritsu Riko). A water-absorbing resin (2) with a mean particle size of 170 μm was thus obtained.

PRODUCTION EXAMPLE 7

A hydrophilic binder resin (b) was prepared in the following manner. Thus, a 50-liter vessel type reactor equipped with a thermometer and a dropping device was charged with 0.50 kg of acrylic acid, 2.40 kg of ethyl acrylate, 0.20 kg of methyl methacrylate, 12 g of 2,2'-azobis(2,4-dimethylvaleronitrile) (polymerization initiator) and 3 kg of methyl alcohol (solvent) The dropping device was charged with a mixed solution composed of 1.15 kg of acrylic acid, 1.9 kg of methyl acrylate, 3.95 kg of methyl methacrylate, 25 g of 2,2'-azobis(2,4-dimethylvaleronitrile) and 7 kg of methyl alcohol.

The above methyl alcohol solution was heated at 65° C. with stirring in a nitrogen gas atmosphere and the reaction was thus allowed to proceed for 20 minutes. By doing so, the conversion of the contents was adjusted to 70%. Then, while the inside temperature was maintained at 65° C., the above mixed solution was added dropwise from the dropping device uniformly over 2 hours. After completion of the dripping, the contents were further aged at 65° C. for 3 hours. After completion of the reaction, 10 kg of methyl alcohol was admixed with the contents to give a 33% (by weight) methyl alcohol solution of a hydrophilic binder resin (5).

The thus-obtained hydrophilic binder resin (5) had a weight average molecular weight of 140, 000 and an acid value of 129 mg KOH/g. The hydrophilic binder resin (5) was subjected to differential scanning calorimetry and it was found that the hydrophilic binder resin (5) had two glass transition temperatures within the range of −80° C. to 120° C. Further, the methyl alcohol solution of the hydrophilic binder resin (5) as obtained in the above manner was deprived of the solvent using a twin-screw extruder to give cylindrical pellets having a diameter of 3 mm and a length of 3 mm. A 10-g portion of the pellets were introduced into 500 g of a 0.4% (by weight) aqueous solution of sodium hydroxide as placed in a beaker at room temperature and the mixture was stirred using a magnetic stirrer. Complete dissolution was realized in 4 hours.

PRODUCTION EXAMPLE 8

A hydrophilic binder resin (b) was prepared in the following manner. Thus, a 50-liter vessel type reactor equipped with a thermometer and a dropping device was charged with 0.58 kg of acrylic acid, 1.925 kg of methyl acrylate, 2.15 kg of ethyl acrylate, 2.95 kg of methyl methacrylate, 33 g of 2,2'-azobis(2,4-dimethylvaleronitrile) (polymerization initiator) and 15 kg of methyl alcohol (solvent).

The above methyl alcohol solution was heated at 65° C. with stirring in a nitrogen gas atmosphere and the reaction was thus allowed to proceed for 5 hours. By doing so, a 33% (by weight) methyl alcohol solution of a hydrophilic binder resin (6) was obtained. The binder resin obtained had a weight average molecular weight of 110,000 and an acid value of 55 mg KOH/g.

EXAMPLE 6

A water blocking agent (paint) (5) according to the present invention was prepared by realizing dispersion by mixing up 50 weight parts of the water-absorbing resin (2) produced in Production Example 6 and 150 weight parts of the 33% methyl alcohol solution of hydrophilic binder resin (5) produced in Production Example 7.

(1) The above water blocking agent (paint) (5) was determined for adhesion (X) by the method described below. The result is shown in Table 3.
① The water blocking agent (5) was applied to steel materials having a size of 50 mm×50 mm (3 mm in thickness) to a dry film thickness of 200 μm and then dried (n=3).
② Then, such a steel-made tool as shown in FIG. 3 was adhered to each of the steel material lower surface (with no water blocking agent applied) and the steel material upper surface (the surface coated with the water blocking agent (5)) using the epoxy-based adhesive Araldite Rapid (product of Ciba Geigy) (total of two tools) and cure was effected by 3 hours of aging at 25° C.
③ The adhesion (peel strength) between the substrate and water blocking agent was determined using a tensile tester (Instron model 1185) (25° C., tensile strength: 10 mm/min)
④ The mean value of all data exclusive of the data for the samples showing peeling at other sites than between the substrate and water blocking agent was reported as the adhesion (X). The result is shown in Table 3.
(2) The above water blocking agent (paint) (5) was evaluated for breaking strength (Y) by the method described below. The results are shown in Table 3.
① The above water blocking agent (paint) (5) was made into a film on a Teflon sheet and JIS K 6301 No. 3 dumbbell specimens were punched out therefrom (n=5). The mean dumbbell thickness was 200 μm.
② The film (No. 3 dumbbell) from the water blocking agent (5) as prepared as mentioned above under ① was determined for breaking strength (Y) using a tensile tester (Instron model 1185) (25° C., rate of pulling: 50 mm/min)
③ The mean value of all data was reported as the breaking strength (Y). The result is shown in Table 3.
(3) Manner of peeling upon peeling with a nail The surface of the steel material (50 mm×50 mm) (thickness 3 mm) coated with the water blocking agent (5) in the manner mentioned above under (1) was scratched with a nail and the manner of peeling of the film was examined. The result is shown in Table 3.

EXAMPLE 7

The procedure of Example 6 was followed in the same manner except that the water blocking agent (coating) (6) according to the invention was prepared by realizing dispersion by mixing up 50 parts by weight of the water-absorbing resin (2) produced in Production Example 6 and 250 parts by weight of the 33% (by weight) methyl alcohol solution of hydrophilic binder resin (6) produced in Production Example 8 and that water blocking agent (coating) (6) was used in lieu of the water blocking agent (5) in Example 6. The water blocking agent (coating) (6) was evaluated for adhesion (X), breaking strength (Y) and manner of peeling upon peeling with a nail by the methods mentioned above. The results are shown in Table 3.

COMPARATIVE EXAMPLE 6

The procedure of Example 6 was followed in the same manner except that Pile Lock NS (product of Nippon Kagaku Toryo) was used in lieu of the water blocking agent (5) in Example 6, and Pile Lock NS (product of Nippon Kagaku Toryo) was evaluated for adhesion (X), breaking strength (Y) and manner of peeling upon peeling with a nail by the methods mentioned above. The results are shown in Table 3.

COMPARATIVE EXAMPLE 7

Water absorbing resin/FLOWBACK K2010 (trademark)/ PEO-8 (trade mark)/polyethylene glycol #400/stearic acid= 100/100/10/10/2 (weight part)

FLOWBACK K 2010 (trade mark) is an ethylene-vinyl acetate copolymer (Sumitomo Seika Corp.). PEO-8 (trade mark) is a polyethylene oxide (Sumitomo Seika Corp.).

The components of the above formulation were mixed with mixer, and then kneaded with 6-inch open roll at 80° C. for 15 min. Thereafter, heat-press (140° C.×10 min.) was carried out to obtain water-retentive material of water-absorbing property having 15 mm thickness, and 50 g of this water-retentive material was dissolved into 50 g of tetrahydrofuran to obtain a comparative water blocking agent (3).

The procedure of Example 6 was followed in the same manner except that the comparative water blocking agent (3) was used in lieu of the water blocking agent (5) in Example 6 and evaluated for adhesion (X), breaking strength (Y) and manner of peeling upon peeling with a nail by the methods mentioned above. The results are shown in Table 3.

COMPARATIVE EXAMPLE 8

Water absorbing resin/TOSO-CSM TS-430 (trade mark)/ water/stearic acid/magnesium oxide/KNOCKCELLER TRA (trade mark)/KNOCKCELLER DM (trade mark)=100/ 100/50/2/20/2/0.5 (weight part)

TOSO-CSM TS-43 (trade mark) is a chlorosulfonyl polyethylene (TOSO Corp.). KNOCKCELLER TRA (trade mark) and KNOCKCELLER DM (trade mark) are vulcanizing agents (Ouchi Sinko Corp.). The components of the above formulation were mixed with mixer, and then kneaded with 6-inch open roll. Thereafter, heat-press (150° C.×30 min.) was carried out to obtain water-retentive material of water-absorbing property having 2 mm thickness, and 50 g of this water-retentive material was dissolved into 50 g of toluene to obtain a comparative water blocking agent (4).

The procedure of Example 6 was followed in the same manner except that the comparative water blocking agent (4) was used in lieu of the water blocking agent (5) in Example 6 and evaluated for adhesion (X), breaking strength (Y) and manner of peeling upon peeling with a nail by the methods mentioned above. The results are shown in Table 3.

COMPARATIVE EXAMPLE 9

Water absorbing resin/BOND G17 (trade mark)/toluene= 100/2000/2567 (weight part)

BOND G17 (trade mark) is a chloroprene adhesive (nonvolatile matter 30%, Konishi Corp.).

A vial (vol. 220 cc) was charged with the components of the above formulation (total weight 100 g) and glass beads (3 ø, 50 g), and mixing with shaking was carried out with paint shaker for about 4 hours to obtain a comparative water blocking agent (5).

The procedure of Example 6 was followed in the same manner except that the comparative water blocking agent (5)

COMPARATIVE EXAMPLE 11

Hydrogel/cellulose acetate/methyl ethyl ketone=16/4/20 (weight part)

The components of the above formulation were mixed and kneaded to obtain a comparative water blocking agent (7).

The procedure of Example 6 was followed in the same manner except that the comparative water blocking agent (7) was used in lieu of the water blocking agent (5) in Example 6 and evaluated for adhesion (X), breaking strength (Y) and manner of peeling upon peeling with a nail by the methods mentioned above. The results are shown in Table 3.

COMPARATIVE EXAMPLE 12

Hydrogel/cellulose acetate/bentonite/acetone=6/4/10/20 (weight part)

The components of the above formulation were mixed and kneaded to obtain a comparative water blocking agent (8).

The procedure of Example 6 was followed in the same manner except that the comparative water blocking agent (8) was used in lieu of the water blocking agent (5) in Example 6 and evaluated for adhesion (X), breaking strength (Y) and manner of peeling upon peeling with a nail by the methods mentioned above. The results are shown in Table 3.

TABLE 3

|  | Ex. 6 | Ex. 7 | Compar. Ex. 6 | Compar. Ex. 7 | Compar. Ex. 8 | Compar. Ex. 9 | Compar. Ex. 10 | Compar. Ex. 11 | Compar. Ex. 12 |
|---|---|---|---|---|---|---|---|---|---|
| Wataer blocking agent | Wataer blocking agent (5) | Wataer blocking agent (6) | Pile Lock NS (product of Nippon Kagaku Toryo) | Compar. Wataer blocking agent (3) | Compar. Wataer blocking agent (4) | Compar. Wataer blocking agent (5) | Compar. Wataer blocking agent (6) | Compar. Wataer blocking agent (7) | Compar. Wataer blocking agent (8) |
| Adhesion (X) (N/cm$^2$) | 300 | 330 | 150 | 138 | 75 | 143 | 86 | 68 | 93 |
| Breaking strength (Y) (N/cm$^2$) | 380 | 570 | 380 | 348 | 3173 | 534 | 813 | 214 | 229 |
| Adhesion (X)/ breaking strength (Y) | 0.79 | 0.58 | 0.40 | 0.40 | 0.02 | 0.27 | 0.11 | 0.32 | 0.40 |
| Peeling of the agent upon peeling with a nail | Only slightly around the site of peeling with a nail | Only slightly around the site of peeling with a nail | Largely around the site of peeling with a nail | Largely around the site of peeling with a nail | Largely around the site of peeling with a nail | Largely around the site of peeling with a nail | Largely around the site of peeling with a nail | Largely around the site of peeling with a nail | Largely around the site of peeling with a nail | was used in lieu of the water blocking agent (5) in Example 6 and evaluated for adhesion (X), breaking strength (Y) and manner of peeling upon peeling with a nail by the methods mentioned above. The results are shown in Table 3.

COMPARATIVE EXAMPLE 10

Hydrogel/cellulose acetate/acetone=16/4/20 (weight part)

The components of the above formulation were mixed and kneaded to obtain a comparative water blocking agent (6).

The procedure of Example 6 was followed in the same manner except that the comparative water blocking agent (6) was used in lieu of the water blocking agent (5) in Example 6 and evaluated for adhesion (X) breaking strength (Y) and manner of peeling upon peeling with a nail by the methods mentioned above. The results are shown in Table 3.

As can be seen in Table 3, the adhesion (X)/breaking strength (Y) ratio of the water blocking agent (5) was 0.79, namely higher than 0.5, and further, as for the manner of peeling, only the close vicinity of the site of peeling with a nail was peeled off and the peeled area was small, hence the result was very good. The adhesion (X)/breaking strength (Y) ratio of the water blocking agent (coating) (6) was 0.58, namely higher than 0.5, and further, as for the manner of peeling, only the near vicinity of the site of peeling with a nail was peeled off and the peeled area was small, hence the result was very good. On the contrary, the adhesion (X)/ breaking strength (Y) ratio of Pile Lock NS (product of Nippon Kagaku Toryo) was 0.40, namely smaller than 0.5, and further, as for the manner of peeling, a considerable area surrounding the site of peeling with a nail was also peeled off and the peeled area was large, hence the result was poor. In comparative water blocking agents (3) to (8) respectively obtained by the methods of Comparative Examples 7 to 12, the adhesion (X)/breaking strength (Y) ratio was less than 0.5, and further, as for the manner of peeling, a considerable area surrounding the site of peeling with a nail was also peeled off and the peeled area was large, hence the result was poor.

EXAMPLE 8

A rectangular parallelepiped gap (5 mm×12 mm×50 mm) was formed in the same manner as in Example 1 except that the water blocking agent (coating) (5) of Example 6 was used. Then, the gap carrying the coating for water blocking agents applied thereto was placed on the bottom sheet of the water penetration rate measuring apparatus shown in FIG. 2, and the water penetration rates were calculated in the same manner as in Example 1. The results are shown in Table 4.

COMPARATIVE EXAMPLE 13

The procedure of Example 8 was followed in the same manner except that Pile Lock NS (urethane prepolymer-based composition, product of Nippon Kagaku Toryo) was used as the water blocking agent and applied to a thickness of 2,000 $\mu$m. The water penetration rates determined on that occasion are shown in Table 4.

TABLE 4

|  | Ex. 8 | Compar. Ex. 13 |
|---|---|---|
| Coating for water blocking agents | Coating (5) | Pile Lock NS (product of Nippon Kagaku Toryo) |
| Film thickness ($\mu$m) | 600 | 2000 |
| Time | Water penetration rate ($10^{-6}$ cm/sec) | |
| 10 min. | 36.0 | 550 |
| 1 hr. | 17.0 | 300 |
| 6 hrs. | 3.2 | 84 |
| 1 day | 0.7 | 3.5 |
| 7 days | 0.6 | 1.0 |
| 14 days | 0.6 | 0.9 |
| 30 days | 0.6 | 1.0 |

Film thickness: Film thickness upon drying

As is evident from the results shown in Table 4, the coating for water blocking agents of the present invention gave very good result as a water blocking agent, namely ① the finally attained water penetration rate was low (indicative of high levels of water blocking performance), ② the time required for arrival at the final water penetration rate was short (arrival in about 1 day; rapid rate of swelling) and ③ thin films could exhibit high levels of water blocking performance (inexpensive; less peelable in the step of driving sheet piles or the like into the ground), among others. Pile Lock NS (urethane prepolymer-based composition; product of Nippon Kagaku Toryo) gave inferior results as a water blocking agent as compared with Example 8, namely ① the finally attained water penetration rate was rather high (about 2 times as compared with Example 8; somewhat lower water blocking performance), ② the time required for arrival at the final water penetration rate was long (arrival in about 7 days; slow rate of swelling) and ③ thick films were required for exhibiting a sufficient level of water blocking performance (expensive; readily peelable on the occasion of driving sheet piles and the like into the ground).

EXAMPLE 9

A 200-$\mu$m-thick coating film was formed by drying the water blocking agent (5) of Example 6 on a Teflon sheet. A portion (about 0.5 g) was cutoff from the coating film and tested for swelling rates ((film weight after swelling—film weight before swelling)/film weight before swelling, 25° C., after 24 hours of immersion) in deionized water and artificial seawater (Aquamarine S (product of Yashima Yakuhin) for 25 L) and for water absorbing rate (swelling (times) after 10 minutes of immersion). The results are summarized in Table 5.

COMPARATIVE EXAMPLE 14

The procedure of Example 9 was followed in the same manner except that a coating film (film thickness 200 $\mu$m) made of Pile Lock NS (urethane prepolymer-based composition, product of Nippon Kagaku Toryo) was used in lieu of the coating film made of the coating for water blocking agents (5), and the swelling rates ((film weight after swelling—film weight before swelling)/film weight before swelling, 25° C., after 24 hours of immersion) and the water absorbing rate (swelling (times) after 10 minutes of immersion) were determined. The results are summarized in Table 5.

TABLE 5

|  | Ex. 9 | Compar. Ex. 8 |
|---|---|---|
| Coating for water blocking agents | Coating (5) | Pile Lock NS |
| Swelling (times, 25° C., 24 hrs) | | |
| Deionized water | 15 | 4 |
| Artificial seawater | 10 | 3 |
| Water absorbing rate (deionized water) | 10 | 1.2 |

Swelling (times): (Film weight after swelling (immersion) - film weight before swelling (immersion))/film weight before immersion, (times)
Water absorbing rate: Swelling (times) after 10 minutes of film immersion
Artificial seawater: Aquamarine S (product of Yashima Yakuhin) for 25 L was used As is seen from the results shown in Table 5, the coating film of the coating for water blocking agents (5) of the present invention gave good results, namely both the water absorbing rate and swelling rate (water, artificial seawater) were high. On the contrary, the coating film from Pile Lock NS (urethane prepolymer-based composition, product of Nippon Kagaku Toryo) gave poor results, namely both the water absorbing rate and swelling rate (water, artificial seawater) were low.

What is claimed is:

1. A water blocking construction method utilizing a coating for water blocking agents to fill empty joint spaces on continuous walls comprising a water-absorbing resin (a), a hydrophilic binder resin (b) and a solvent (c), wherein said hydrophilic binder resin (b) has an acid value of 40 mg KOH/g to 500 mg KOH/g.

2. The water blocking construction method according to claim 1, wherein said water-absorbing resin (a) is a salt-resistant, water-absorbing resin.

3. A coating for water blocking agents to fill empty joint spaces on continuous walls comprising a water-absorbing resin (a), a hydrophilic binder resin (b) and a solvent (c), wherein said hydrophilic binder resin (b) has an acid value of 40 mg KOH/g to 500 mg KOH/g and the coating for water blocking agents forms a water blocking coating film on a steel material surface, a ratio (X/Y) between the adhesion (X) of said water blocking coating film to the surface and the breaking strength (Y) of said water blocking coating film being not less than 0.5.

4. A water blocking construction method utilizing a sheet pile or steel tubular pipe
   wherein the sheet pile or steel tubular pipe has been applied thereto in advance by the water blocking construction method according to claim 1.

5. A coating for water blocking agents to fill empty joint spaces on continuous walls comprising a water absorbing resin (a), a hydrophilic binder resin (b) and a solvent (c),
   wherein said hydrophilic binder resin (b) has an acid value of 40 mg KOH/a to 500 mg KOH/g, and
   the coating for water blocking agents is removable from the substrate of continuous walls after use.

6. A coating for water blocking agents to fill empty joint spaces on continuous walls comprising water-absorbing resin (a), a hydrophilic binder resin (b) having an acid value of 40 mg KOH/g to 500 mg KOH/g and a solvent (c),
   wherein said water-absorbing resin (a) is a salt-resistant, water-absorbing resin, and
   the coating for water blocking agents is removable from the substrate of continuous walls after use.

\* \* \* \* \*